United States Patent [19]

Ikeura

[11] Patent Number: 5,078,112
[45] Date of Patent: Jan. 7, 1992

[54] APPARATUS AND METHOD FOR IMPROVING THE JOLT CONTROL IN A MOTOR VEHICLE DRIVE SYSTEM

[75] Inventor: Kenji Ikeura, Zushi, Japan

[73] Assignee: Nissan Motor Co., Ltd., Yokohama, Japan

[21] Appl. No.: 360,833

[22] Filed: Jun. 2, 1989

[30] Foreign Application Priority Data

Jun. 2, 1988 [JP] Japan ................. 63-136910

[51] Int. Cl.$^5$ ................................. F02P 5/00
[52] U.S. Cl. ..................... 123/406; 123/417; 123/585
[58] Field of Search ......... 123/406, 417, 585; 74/858, 872; 440/1

[56] References Cited

U.S. PATENT DOCUMENTS

| 4,266,447 | 5/1981 | Heess et al. | 74/866 |
| 4,355,550 | 10/1982 | Will et al. | 74/872 |
| 4,403,527 | 9/1983 | Mohl et al. | 74/851 |
| 4,520,694 | 6/1985 | Eschrich et al. | 74/872 |
| 4,680,992 | 7/1987 | Hayasaki et al. | 74/869 |
| 4,909,764 | 3/1990 | Hirukawa et al. | 123/406 |

FOREIGN PATENT DOCUMENTS 58-77138 5/1983 Japan .

OTHER PUBLICATIONS

"Nissan Full-Range Automatic Transmission RE4R-01A Type", Service Manual (A261C07), Mar. 1987.

Primary Examiner—Raymond A. Nelli
Attorney, Agent, or Firm—Foley & Lardner

[57] ABSTRACT

A jolt control wherein the amount of additional intake air is increased and the ignition timing is retarded to compensate for undesired variation in transmission output torque during a gear shift operation.

10 Claims, 6 Drawing Sheets

APPARATUS AND METHOD FOR IMPROVING THE JOLT CONTROL IN A MOTOR VEHICLE DRIVE SYSTEM

BACKGROUND OF THE INVENTION

The present invention relates to a jolt control system in a motor vehicle, and more particularly to jolt control in a motor vehicle drive system including an internal combustion engine and an automatic transmission that is variable in steps.

Jolt control systems are known in which the torque delivered by the internal combustion engine is decreased during the gear shift operation. For example, in U.S. Pat. No. 4,266,447 (Hess et al.), a jolt control system is described in which the engine torque is decreased during a gear shift from the time the engine speed reaches an initiating speed until the time the engine speed reaches an end speed. Various different initiating and end speeds are stored in a plurality of storage locations in storage. Addresses in the storage are computed in response to the engine speed signal and upshift or downshift signal for calling out the initiating speed and end speed from the storage.

U.S. Pat. No. 4,355,550 (Will et al.) discloses a jolt control system wherein the torque delivered from the internal combustion engine is decreased during a gear shift at a gradual changing rate.

U.S. Pat. No. 4,403,527 (Mohl et al.) discloses a jolt control system. An automatic transmission control unit in a motor vehicle furnishes a signal which signifies that the torque delivered by the internal combustion engine is to be decreased. In response to this signal, the ignition timing is delayed or the width of fuel injection pulses is shortened.

JP 58-77138 A (Toyota) discloses a jolt control system. In this known system, the torque delivered from the internal combustion engine is decreased during a gear shift with the engine throttle kept opened, while the torque is increased during a downshift caused by deceleration with the engine throttle held at idle speed position.

These known jolt control systems have the common disadvantage that the torque delivered by the internal combustion engine is either decreased or increased during a gear shift. None of these systems consider that the torque delivered by the internal combustion engine should be increased and then decreased in order to suppress undesired variation in the torque delivered by the transmission output shaft during a gear shift. For example, during an upshift, the torque delivered by the transmission output shaft is decreased during the torque phase and then increased during the subsequent inertia phase. During a downshift, the torque delivered by the transmission output shaft is decreased during the inertia phase and then increased at the end of the downshift.

An object of the present invention is to provide a jolt control system which is improved such that the torque delivered by the internal combustion engine is varied in the optimum manner so as to suppress undesired variation in the torque delivered by the transmission output shaft during a gear shift.

SUMMARY OF THE INVENTION

According to one aspect of the present invention, there is provided in a drive system including an internal combustion engine and an automatic transmission operable in a plurality of gear ratios, a method of decreasing jolt during a gear shift operation, comprising the steps of:

furnishing a first instruction signal signifying a change in a first predetermined operating variable which causes the internal combustion engine to produce increased engine torque during the gear shift operation;

varying said first predetermined operating variable in response to said first instruction signal;

furnishing a second instruction signal signifying a change in a second predetermined operating variable which causes the internal combustion engine to produce decreased engine torque during the gear shift operation for suppressing undesired variation in the transmission output torque during the gear shift operation; and varying said second predetermined operating variable in response to said second instruction signal.

According to another aspect of the present invention, there is provided in a drive system including an internal combustion engine and an automatic transmission operable in a plurality of gear ratios, an apparatus for decreasing jolt during a gear shift operation, comprising:

means for furnishing a first instruction signal signifying a change in a first predetermined operating variable which causes the internal combustion engine to produce increased engine torque during the gear shift operation;

means for varying said first predetermined operating variable in response to said first instruction signal;

means for furnishing a second instruction signal signifying a change in a second predetermined operating variable which causes the internal combustion engine to produce decreased engine torque during the gear shift operation for suppressing undesired variation in the transmission output torque during the gear shift operation; and means for varying said second instruction signal in response to said second instruction signal.

DETAILED DESCRIPTION OF THE INVENTION

Figure 1:
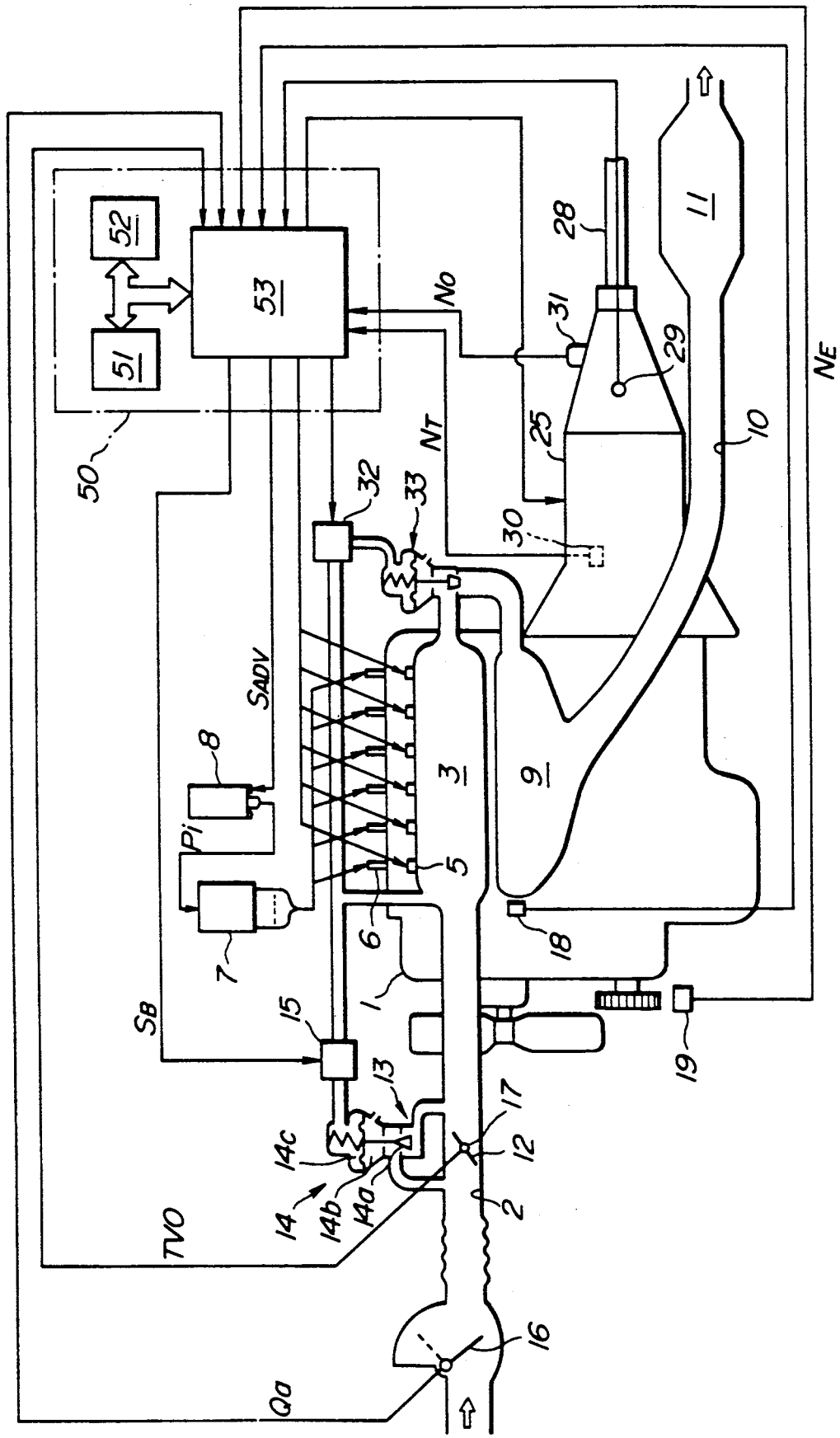
FIG. 1 is a block diagram showing a first embodiment of an apparatus according to the present invention.

Referring to FIG. 1, a vehicle drive system is illustrated which includes an internal combustion engine 1 of the fuel injection type and an automatic transmission 25. In the usual manner, the engine 1 drives a pump impeller of a torque converter which in turn hydraulically drives a turbine runner thereof. The turbine runner has a turbine shaft which is a transmission input shaft of the automatic transmission. The automatic transmission 25 is operable in a four gear ratios during forward travel of the motor vehicle.

Intake air to the engine 1 passes through a throttle chamber 2 and an intake manifold 3. Fuel is injected into each of a plurality of cylinders via the corresponding one of a plurality of injectors 5 in accordance with the width of fuel injection pulse $S_{Ti}$.

Ignition plugs 6 are arranged for the cylinders, respectively. In a predetermined order, the ignition plugs 6 are subjected to a high voltage pulse $P_i$ supplied thereto from an ignition coil 8 via a distributor 7. The ignition coil 8 generates this high voltage pulse $P_i$ in accordance with an ignition signal $S_{ADV}$. Exhaust gas resulting from combustion within the cylinders is discharged through an exhaust manifold 9 and an exhaust pipe 10 to the open air. The exhaust gas is subjected to purification at a three-way catalytic converter 11.

The amount of intake air $Q_a$ supplied to the engine 1 is measured by an air flow meter 16. The intake air $Q_a$ is mainly controlled by a throttle 12 which opens in degrees in response to a power demand by an operator. Additional intake air $q_a$ is supplied to the engine 1 via an additional air supply passage 13 which is connected to the throttle chamber 2 bypassing the throttle 12. The additional air supply passage 13 is provided with an air control valve 14 including a valve element 14a. The valve element 14a fully opens the additional air supply passage 13 in its spring set position under the influence of a return spring mounted in a vacuum chamber 14c of a vacuum actuator for the valve element 14a. The vacuum actuator also includes an atmospheric chamber 14b. When the vacuum develops in the vacuum chamber 14c, the valve element 14a is lifted against the return spring to decrease the degree of opening of the additional air supply passage 13. The amplitude of vacuum within the vacuum chamber 14c is controlled by a solenoid 15. More specifically, the vacuum chamber 14c communicates with the engine intake manifold 3 via a flow restrictor. An air admission port is provided between the flow restrictor and the vacuum chamber 14c. The air admission port is normally closed by the valve element of the solenoid 15. Upon energization, the solenoid 15 opens the air admission port, thus allowing atmospheric air to enter the vacuum chamber 14c, preventing creation of vacuum within the vacuum chamber 14c. The solenoid 15 is energized when supplied with an additional air control signal $S_B$. Thus, when the signal $S_B$ is supplied to the solenoid 15, the valve element 14a is allowed to move under the bias of the return spring to increase the opening degree of the additional air passage 13, resulting in an increase in the amount of additional air $q_a$ supplied to the engine 1.

A throttle sensor 17 is provided to detect throttle valve opening TVO of the throttle 12. A coolant temperature sensor 18 is provided to detect the temperature of the engine coolant. A crankshaft angle sensor 19 is provided to detect crank angle. The output of this crankshaft angle sensor 19 is used to measure the engine speed $N_E$ of the engine 1. The reference numeral 32 denotes an EGR solenoid under which the vacuum supplied to an EGR control valve 33 is controlled.

The automatic transmission 25 is of the RE4R01A type manufactured in Japan by Nissan Motor Company Limited. This known automatic transmission is described in "NISSAN FULL-RANGE AUTOMATIC TRANSMISSION RE4R01A TYPE, SERVICE MANUAL, (A261C07)" issued on March, 1987 by NISSAN MOTOR COMPANY LIMITED, and also disclosed in U.S. Pat. No. 4,680,992 issued to Hayasaki et al. on Jul. 21, 1987.

The automatic transmission 25 receives an input torque from the turbine shaft of the torque converter and delivers an output torque via a transmission output shaft 28. The turbine revolution speed $N_T$ is detected by a turbine revolution speed sensor 30, while the transmission output shaft revolution speed $N_O$ is detected by a transmission output shaft revolution speed sensor 31. Designated by the reference numeral 29 is a gear position switch which detects a gear position established in the automatic transmission 25.

The outputs of the above-mentioned sensors or switch are fed to a control unit 50. The control unit 50 includes a CPU 51, a ROM 52, and a group of circuits 53 including an input circuits (I/O) and peripheral circuits.

The amount of additional intake air $g_A$ and the advance of ignition timing ADV are determined by the control unit 50 and the signals $S_B$ and $S_{ADV}$ signify the results determined.

Figure 2:
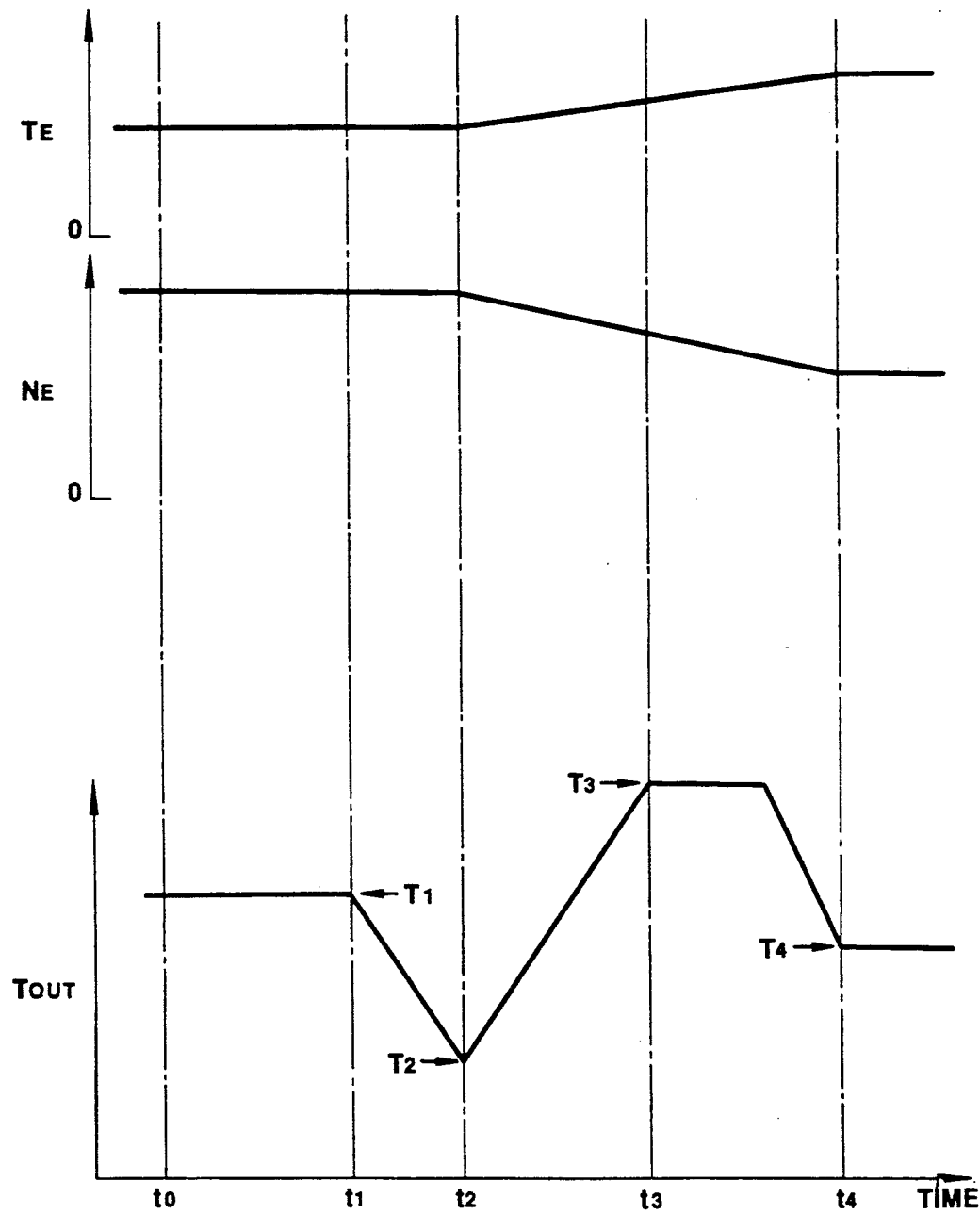
FIG. 2 is a diagram showing the variations of engine torque ($T_E$), engine speed ($N_E$), and transmission output torque ($T_{OUT}$) with respect to time during an upshift with the engine throttle opening maintained unchanged under no jolt control.

FIG. 2 shows the variation of transmission output torque $T_{OUT}$ with respect to time for an upshift with the same throttle opening degree TVO when the jolt control according to the present invention is not carried out. The determination of (or command for) the shift operation takes place at time $t_0$. The start of the torque phase takes place at time $t_1$. During this period, the transmission output torque $T_{OUT}$ remains unchanged and keeps the level $T_1$ that is the same as it was immediately before the shift. During the torque phase, the transmission output torque $T_{OUT}$ is decreased. At time $t_2$, the start of the subsequent inertia phase takes place and the transmission output torque $T_{OUT}$ is decreased to the minimum $T_2$. During the inertia phase, the transmission output torque increases until time $t_3$ when the engagement force which a clutch to be engaged is engaged with after this upshift has reached a stabilized level. The transmission output torque $T_{OUT}$ reaches the maximum $T_3$ at time $t_3$ and thereafter decreased down to a level $T_4$ to be established after the shift at time $t_4$. At time $t_4$, the inertia phase ends, marking the end of the upshift.

Figure 3:
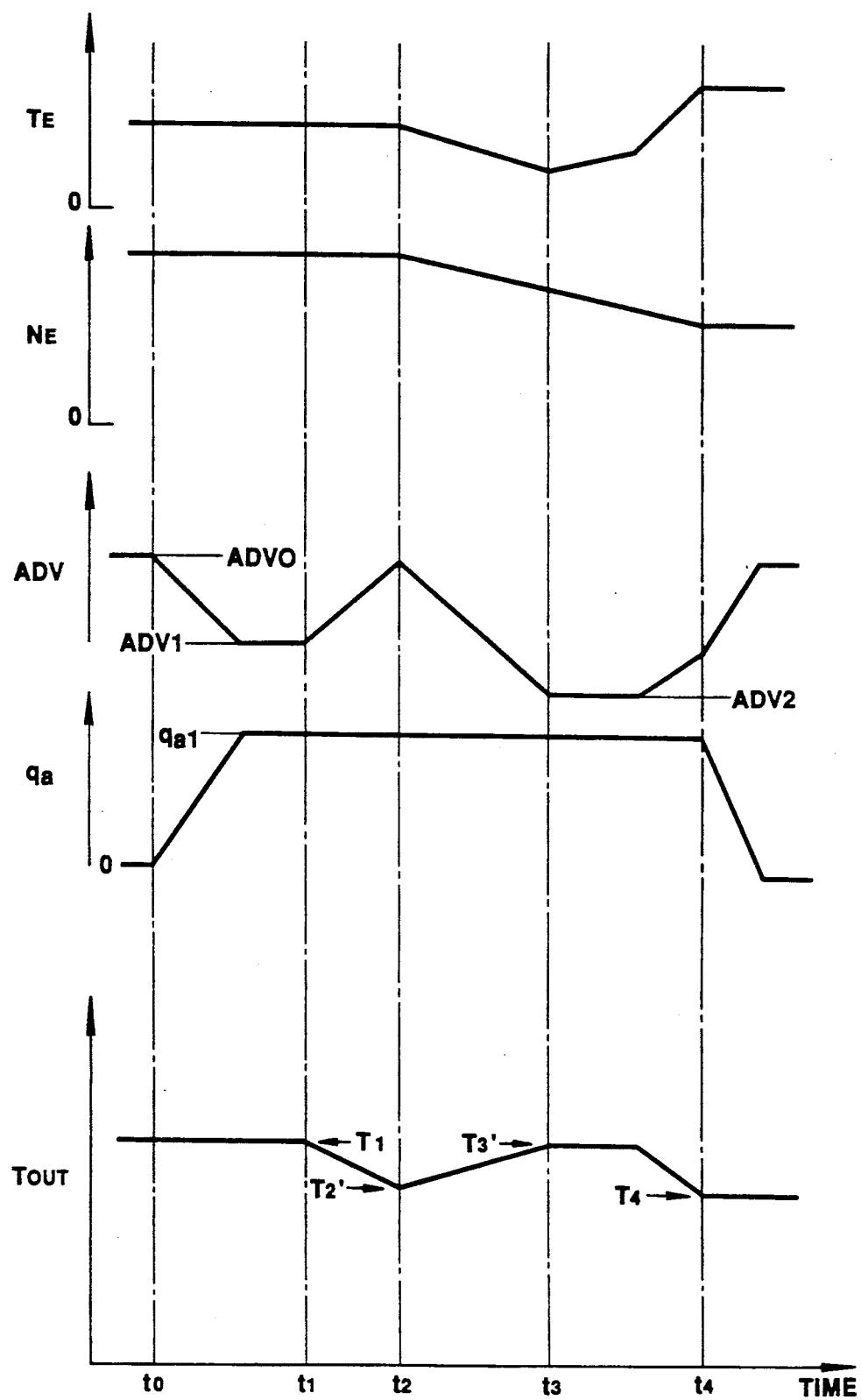
FIG. 3 is a diagram showing the variations of engine torque ($T_E$), engine speed ($N_E$), and transmission output torque ($T_{OUT}$) with respect to time during the same upshift under holt control according to the present invention together with the variations of a first predetermined operating variable in the form of the amount (or the flow rate) of additional air ($q_a$) supplied to the internal combustion engine and a second predetermined operating variable in the form of the advance of ignition timing (ADV) of the engine.

FIG. 3 shows the variations of the amount of additional intake air $q_a$ and advance of ignition timing ADV with respect to time during the same upshift as that shown in FIG. 2 where the jolt control according to the present invention is carried out. Also shown are the variations of engine torque $T_E$, engine speed $N_E$, and transmission output torque $T_{OUT}$. At time $t_0$, the amount of additional intake air of the additional air supply passage 13 defined by the valve element 14a (see FIG. 1). This increase in the amount of additional intake air $q_a$ causes the internal combustion engine 1 to produce increased torque. In order to offset the effect of this increase in the amount of additional intake air $q_a$ on the transmission output torque, the advance of ignition timing ADV is gradually decreased, namely the ignition timing is retarded. During time period between $t_1$ and $t_2$ where the transmission output torque $T_{OUT}$ drops, with the amount of additional air held at the increased level, the advance of ignition timing ADV is gradually increased in such a manner as to permit an increase in transmission output torque caused by the increased amount of additional air $q_a$, thus suppressing the magnitude of this undesired drop in the transmission output torque $T_{OUT}$ during the torque phase. After time $t_2$, the advance of the ignition timing ADV is increased again with the amount of additional air $q_a$ held at the increased level in such a manner as to decrease the engine torque, suppressing the increase in the transmission output torque taking place during time period between $t_2$ and $t_3$. At time when the inertia phase is about to end, the advance of the ignition timing ADV is increased gradually. At time $t_4$ when the end of the inertia phase takes place, the amount of additional intake air $q_a$ is decreased and the advance of the ignition timing ADV is increased until the both return to the initial states. Comparing the variation of transmission output torque $T_{OUT}$ shown in FIG. 3 with the counterpart shown in FIG. 2, it will now be appreciated that the minimum peak is decreased from $T_2$ to $T_2'$ and the maximum peak from $T_3$ to $T_3'$, respectively.

Figure 4:
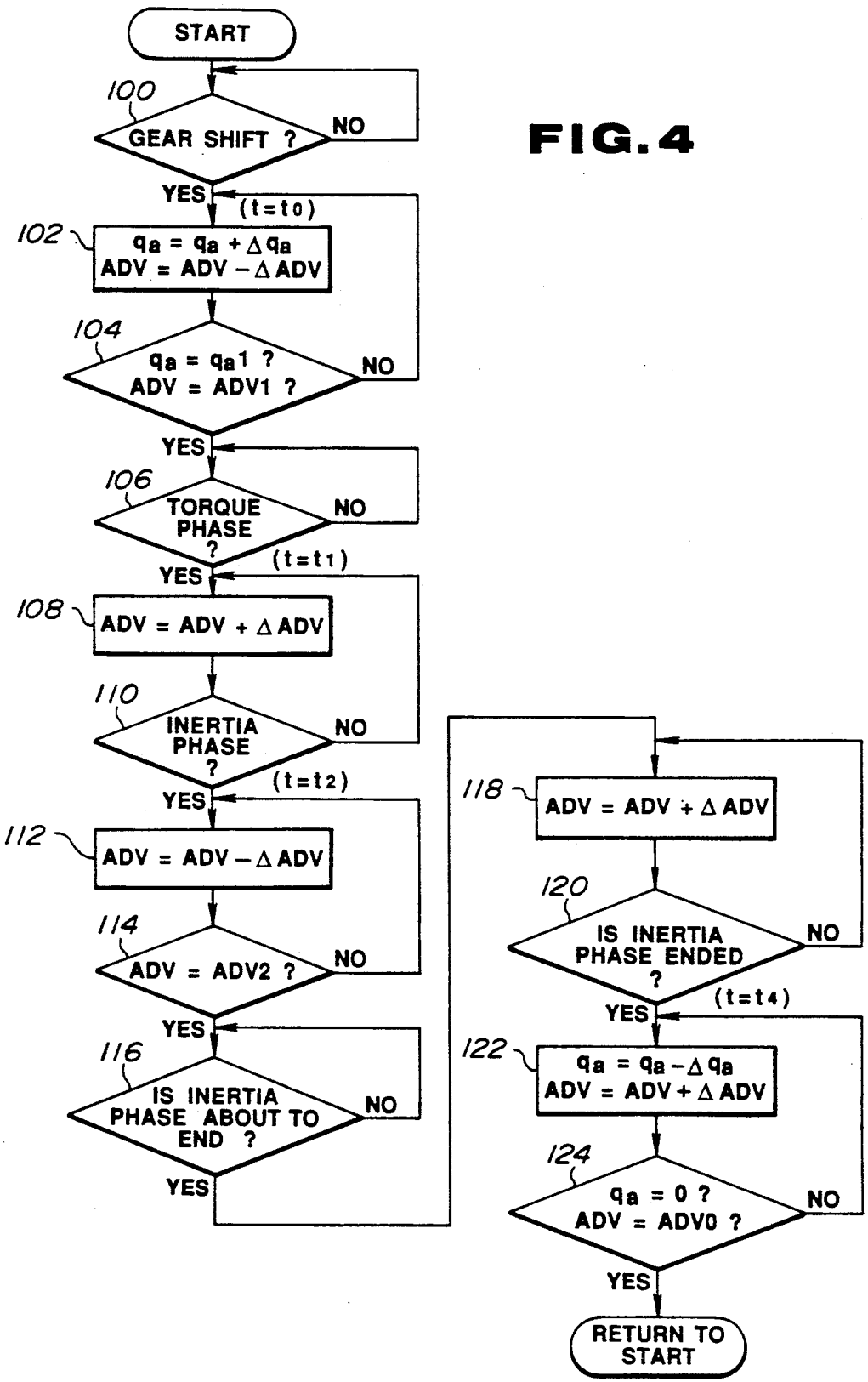
FIG. 4 is a flow chart illustrating operation of the jolt control.

FIG. 4 is a flow chart illustrating a routine. Only the part of the program related to the present invention is shown. The execution of this routine is carried out periodically at 10 ms interval. This does not mean that this routine always starts from the top. Actually, there are a plurality of entry and eject points, although they are not shown in FIG. 4, so that the execution of the program starts from the point where the execution of the program was interrupted in the previous run 10 ms earlier. For example, if the gear shift command is absent (step 100), wait 10 ms and go to step 100. If the gear shift command is present, then go to step 102 and wait 10 ms. In FIG. 4, at step 102, $q_a$ is increased by a predetermined value $\Delta q_a$ (delta $q_a$), and ADV is decreased by a predetermined value $\Delta$ADV (delta ADV). This step 102 is repeated until the conditions described at step 104 are met (see FIG. 3). Whether or not the transmission has entered the torque phase is determined at step 106 by detecting a decrease in transmission output torque $T_{OUT}$. It may be determined by detecting an increase in servo activating hydraulic fluid pressure for the clutch to be engaged after the shift. Alternatively, it may be determined by detecting a decrease in rate of change in turbine shaft speed. In the torque phase, step 108 is repeated until the transmission enters the subsequent inertia phase (see step 110). At step 108, ADV is increased by $\Delta$ADV (delta ADV). Whether the transmission has entered the inertia phase or not is determined by detecting an increase in the transmission output torque $T_{OUT}$. After the transmission has entered the inertia phase, ADV is decreased by $\Delta$ADV (delta ADV) until ADV is decreased down to ADV2 (see step 114 and see FIG. 3). Alternatively, it may be determined whether or not the transmission has entered the inertia phase by checking whether a gear ratio $N_T/N_O$, namely, (turbine shaft speed)/(transmission output shaft speed), drops down to 97% of the gear ratio for the first gear position in the case of 1-2 upshift. When the inertia phase is about to end (see step 116), ADV is increased by $\Delta$ADV (delta ADV) until the end of the inertia phase, is confirmed at step 120. After the end of inertia phase, $q_a$ is returned to the intial state ($q_a = 0$) and ADV is returned to the initial state (ADV=ADVO) at a rapid rate as represented by $\Delta$ADV' (delta ADV'). See steps 122 and 124 in the regard.

Figure 5:
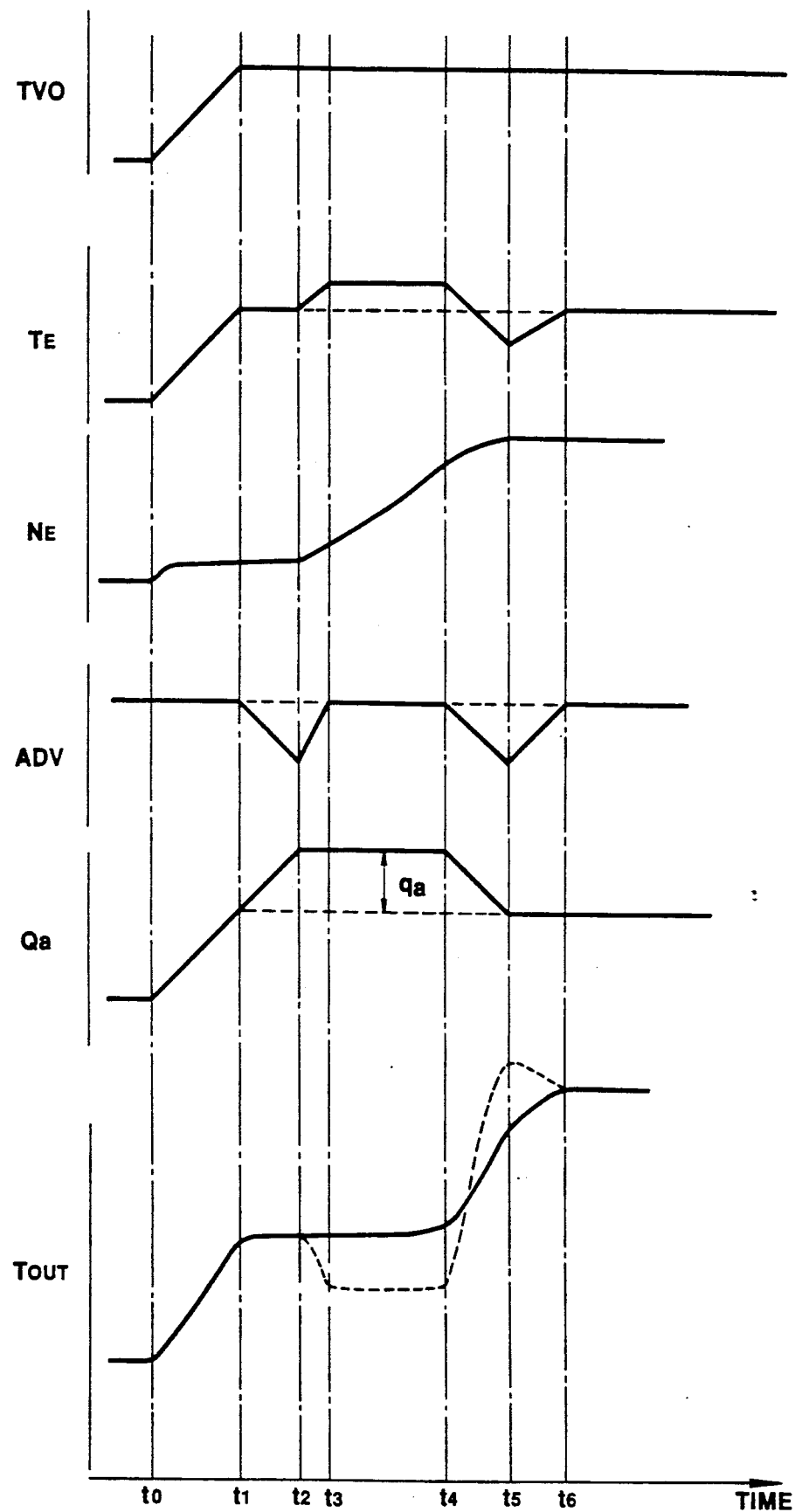
FIG. 5 is a diagram showing the variations engine throttle opening degree (TVO), engine torque ($T_E$), engine speed ($N_E$), and transmission output torque ($T_{OUT}$) with respect to time during a downshift caused by depression of the accelerator pedal, together with the variations of amount of intake air ($Q_A$) admitted to the internal combustion engine and advance of ignition timing (ADV)

FIG. 5 shows a timing diagram for jolt control according to the present invention for a downshift initiated by depression of accelerator pedal. In FIG. 5, the variations according to the jolt control are illustrated by the fully drawn line, whereas the variations without the jolt control and thus being different are illustrated by broken lines. Between $t_0$ and $t_1$, the driver depresses the accelerator pedal and thus TVO is increased and the intake air $Q_a$ is increased accordingly. At time $t_1$, the initiation of downshift is determined. Between $t_1$ and $t_2$, the amount of additional intake air $q_a$ is increased, while the advance of ignition timing ADV is decreased, namely the ignition timing is retarded. At time $t_2$, a higher gear clutch is released and the inertia phase is initiated. Between $t_2$ and $t_3$, ADV is increased to compensate for a drop resulting from consumption for increasing the engine speed during the inertia phase. The inertia phase progress during time period between $t_3$ and $t_4$. Between $t_4$ and $t_5$, in order to increase in transmission output torque caused by engagement of one-way clutch at the termination of the downshift, the amount of additional intake air $q_a$ is decreased to zero and the advance of ignition timing ADV is decreased. Between $t_5$ and $t_6$, the advance of ignition timing ADV is increased upto the initial state.

Figure 6:
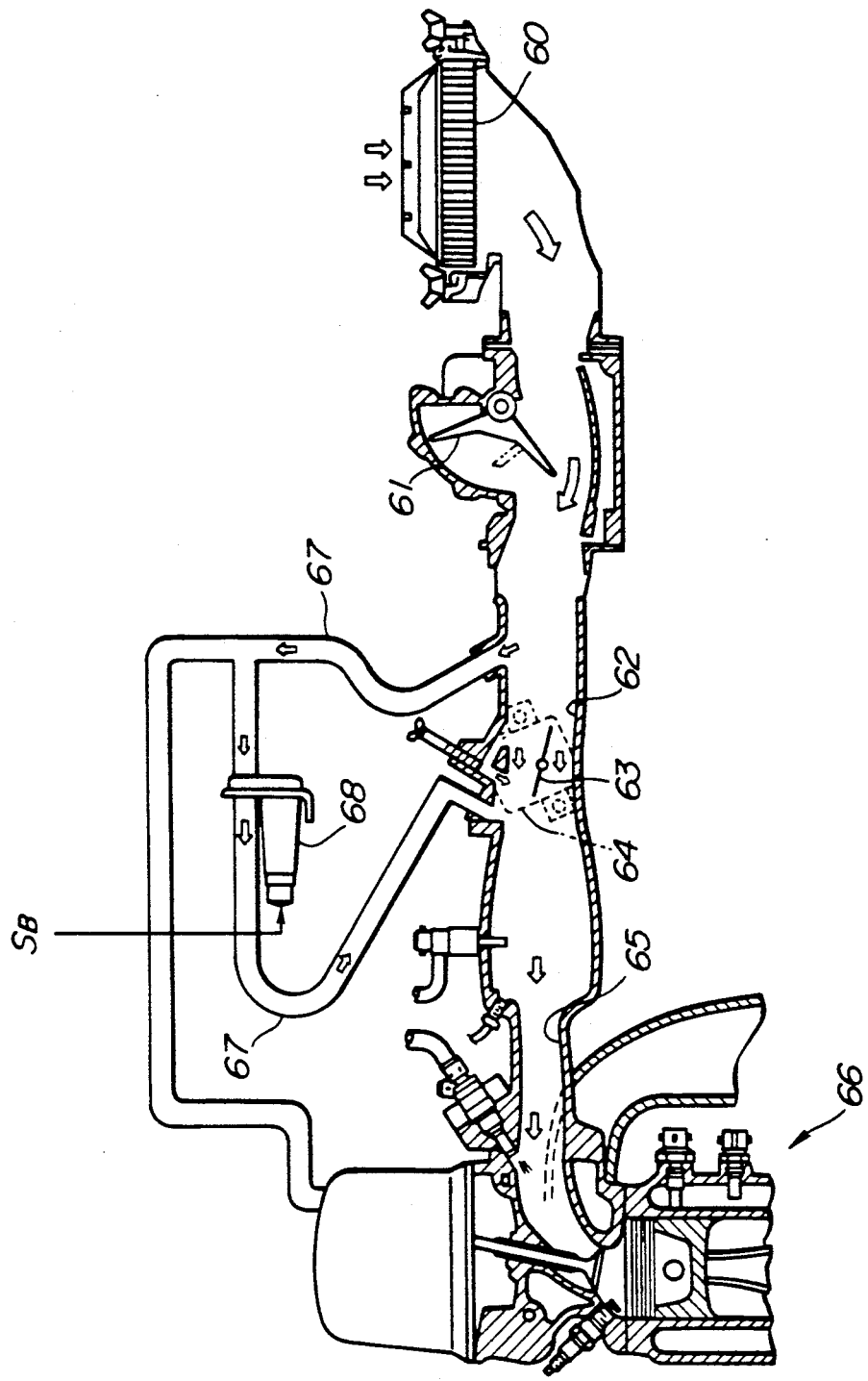
FIG. 6 is a block diagram showing a second embodiment of an apparatus according to the present invention.

FIG. 6 shows a second embodiment of the apparatus according to the present invention. In FIG. 6, the reference numeral 60 denotes an air filter, 61 an air flow meter, 62 a throttle chamber, 63 a throttle valve, 64 a throttle sensor, 65 an intake manifold, 66 an internal combustion engine, and 67 an additional air supply passage.

A solenoid operated air control valve 68 is provided to close or open the additional air supply passage 67, thereby to control the amount of additional air $q_a$.

In the previous description of the invention, the amount of additional air $q_a$ is used as the first predetermined operating variable. Alternatively, the fuel injection amount may be varied or charged pressure may be varied in the case of the engine with turbo charger.

What is claimed is:

1. In a drive system including an internal combustion engine and an automatic transmission operable in a plurality of gear ratios, a method of decreasing jolt during a gear shift operation, comprising the steps of:

furnishing a first instruction signal signifying a change in a first predetermined operating variable which causes the internal combustion engine to produce increased engine torque during the gear shift operation, said first instruction signal being variable in a first predetermined direction during the gear shift operation;

varying said first predetermined operating variable in response to said first instruction signal;

furnishing a second instruction signal signifying a change in a second predetermined operating variable which causes the internal combustion engine to produce decreased engine torque during the gear shift operation for suppressing undesired variation in the transmission output torque during the gear shift operation, said second instruction signal varying in a second predetermined direction pattern during the gear shift operation, said second predetermined direction being different from said first predetermined direction; and varying said second predetermined operating variable in response to said second instruction signal.

2. A method as claimed in claim 1, wherein said first predetermined operating variable is the amount of additional intake air supplied to the internal combustion engine.

3. A method as claimed in claim 2, wherein said second predetermined operating variable is the advance of ignition timing of the internal combustion engine.

4. A method as claimed in claim 3, wherein said change signified by said first instruction signal includes an increase in the amount of additional intake air and the subsequent decrease in supply of additional intake air, and said change signified by said second instruction signal includes a first decrease, by a first predetermined degree, in the advance of ignition timing in such a manner as to offset effect of said increase in the amount of additional intake air on transmission output torque, an increase in the advance of ignition timing in such a manner as to permit engine transmission output torque increase caused by said increase in the amount of additional intake air during the transmission output torque being subject to an undesired drop, and a second decrease, by a second predetermined degree, in the advance of ignition timing in such a manner as to permit torque decrease caused by said decrease by said second predetermined degree, said second decrease in the advance of ignition timing taking place before occurrence of the subsequent decrease in the amount of additional intake air, said second predetermined degree being larger than said first predetermined degree.

5. A method as claimed in claim 3, wherein said change signified by said first instruction signal includes an increase in the amount of additional intake air and the subsequent decrease in the amount of additional intake air, and said change signified by said second instruction signal includes a first decrease, by a first predetermined degree, in the advance of ignition timing in such a manner as to offset effect of said increase in the amount of additional intake air on transmission output torque, an increase in the advance of ignition timing in such a manner as to permit transmission output torque increase caused by said increase in the amount of additional intake air during the transmission output torque being subject to an undesired drop, and a second decrease, by a second predetermined degree, in the advance of ignition timing in such a manner as to permit torque decrease caused by said decrease by said second predetermined degree, said second decrease in the advance of ignition timing taking place on occurrence of the subsequent decrease in the amount of additional intake air.

6. In a drive system including an internal combustion engine and an automatic transmission operable in a plurality of gear ratios, an apparatus for decreasing jolt during a gear shift operation, comprising:

means for furnishing a first instruction signal signifying a change in a first predetermined operating variable which causes the internal combustion engine to produce increased engine torque during the gear shift operation, said first instruction signal being variable in a first predetermined direction during the gear shift operation;

means for varying said first predetermined operating variable in response to said first instruction signal;

means for furnishing a second instruction signal signifying a change in a second predetermined operating variable which causes the internal combustion engine to produce decreased engine torque during the gear shift operation for suppressing undesired variation in the transmission output torque during the gear shift operation, said second instruction signal varying in a second predetermined direction during the gear shift operation, said second predetermined pattern being different from said first predetermined direction; and means for varying said second predetermined operating variable in response to said second instruction signal.

7. An apparatus as claimed in claim 6, wherein said first predetermined operating variable varying means include means for defining an additional air supply passage adapted for supplying an additional intakle air to the internal combustion engine, a flow control valve disposed in said additional air supply passage, vacuum actuator means for actuating said flow control valve in response to vacuum supplied thereto, and means for regulating the magnitude of said vacuum in response to said first instruction signal, and wherein said first predetermined operating variable is the supply of additional air to the internal combustion engine passing through said additional air supply passage.

8. An apparatus as claimed in claim 7, wherein said second predetermined operating variable varying means include means for controlling advancement of ignition timing of the internal combustion engine in response to said second instruction signal, and wherein said second predetermined operating variable is the advancement of ignition timing of the internal combustion engine.

9. An apparatus as claimed in claim 6, wherein said first predetermined operating variable varying means include means for defining an additional air supply passage adapted for supplying an additional air to the internal combustion engine, a flow control valve means disposed in said additional air supply passage for controlling air flow passing through said additional air supply passage in response to said first instruction signal, and wherein said first predetermined operating variable is the amount of additional intake air supplied to the internal combustion engine passing through said additional air supply passage.

10. An apparatus as claimed in claim 9, wherein said second predetermined operating variable varying means include means for controlling advancement of ignition timing of the internal combustion engine in response to said second instruction signal, and wherein said second predetermined operating variable is the advance of ignition timing of the internal combustion engine.

* * * * *